US012577972B2

(12) United States Patent
Allison

(10) Patent No.: US 12,577,972 B2
(45) Date of Patent: Mar. 17, 2026

(54) COORDINATED FLOW PIPE ELBOW

(71) Applicant: Government of the United States, as represented by the Secretary of the Air Force, Wright-Patterson AFB, OH (US)

(72) Inventor: Jonathan Allison, Albuquerque, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 19 days.

(21) Appl. No.: 18/597,363

(22) Filed: Mar. 6, 2024

(65) Prior Publication Data

US 2025/0283491 A1      Sep. 11, 2025

(51) Int. Cl.
*F15D 1/04*      (2006.01)
*F16L 43/00*     (2006.01)

(52) U.S. Cl.
CPC ............... *F15D 1/04* (2013.01); *F16L 43/00* (2013.01)

(58) Field of Classification Search
CPC .................................. F15D 1/04; F16L 43/00
See application file for complete search history.

(56) References Cited

U.S. PATENT DOCUMENTS

| | | |
|---|---|---|
| 1,984,172 A | 12/1934 | Brownley |
| 2,303,949 A | 12/1942 | Nordell |

| | | | |
|---|---|---|---|
| 2,590,797 A | | 3/1952 | Siciliano |
| 4,606,556 A | * | 8/1986 | Metzger ................. F16L 57/06 |
| | | | 285/179 |
| 4,621,953 A | | 11/1986 | McGuth |
| 5,054,819 A | | 10/1991 | Grunwald |
| 5,060,984 A | | 10/1991 | Hess |
| 5,301,984 A | | 4/1994 | Farris |
| 5,323,661 A | | 6/1994 | Cheng |

(Continued)

FOREIGN PATENT DOCUMENTS

| | | |
|---|---|---|
| EP | 3680538 A1 | 1/2020 |
| GB | 184082 A | 8/1922 |

(Continued)

OTHER PUBLICATIONS

Hobas Pipe USA, Non-Circular Profiles, Hobas Pipe USA website, published on the internet at https://hobaspipe.com/products/#ncprofiles prior to the filing date of the present application.

*Primary Examiner* — James M Hewitt, II
(74) *Attorney, Agent, or Firm* — AFMCLO/JAZ; Jeffrey V. Bamber

(57) ABSTRACT

Pipe elbows having an improved interior configuration for more smoothly turning the flow of fluids through the pipe elbow are disclosed. The pipe elbows have an intermediate portion joined to inlet and outlet portions between the inlet and outlet portions. The interior cross-section of the intermediate portion is in the configuration of a closed figure which has a first region between the centerline and the intrados and a second region between the centerline and the extrados in which the first region has a larger cross-sectional area than the second region. The configuration of the cross-sectional area of the intermediate portion is different from the configuration of the inlet and outlet portions.

19 Claims, 9 Drawing Sheets

(56) References Cited

U.S. PATENT DOCUMENTS

| | | | |
|---|---|---|---|
| 5,529,084 A | | 6/1996 | Mutsakis et al. |
| 5,984,374 A * | | 11/1999 | Esser ...................... F16L 57/06 |
| | | | 285/179 |
| 6,179,342 B1 | | 1/2001 | Shen |
| 6,289,934 B1 | | 9/2001 | Welker |
| 6,880,860 B2 | | 4/2005 | Gonzales et al. |
| 6,951,354 B1 * | | 10/2005 | Paulson ................ F16L 43/001 |
| | | | 285/179 |
| 8,419,072 B2 | | 4/2013 | Sisk |
| 9,476,531 B2 | | 10/2016 | McMillan |
| 9,903,256 B2 | | 2/2018 | Sakai et al. |
| 11,002,386 B2 * | | 5/2021 | Silva ...................... F16L 43/00 |
| 11,261,891 B2 | | 3/2022 | Leutwyler et al. |
| 11,585,477 B1 | | 2/2023 | Swingley |

FOREIGN PATENT DOCUMENTS

| | | |
|---|---|---|
| GB | 2041477 A | 9/1980 |
| WO | 2009127192 A1 | 10/2009 |

* cited by examiner

Standard Bend

Flow

Flow

COORDINATED FLOW PIPE ELBOW

RIGHTS OF THE GOVERNMENT

The invention described herein may be manufactured and used by or for the Government of the United States for all governmental purposes without the payment of any royalty.

FIELD OF THE INVENTION

The present invention relates generally to pipe elbows and, more particularly, to pipe elbows having an improved interior configuration for more smoothly turning the flow of fluids through the pipe elbow.

BACKGROUND OF THE INVENTION

Existing pipe elbows frequently have a constant circular cross section. That is, the cross-sectional shape of the elbow does not change as the liquid traverses it from inlet to outlet. The elbow merely bends around the turn angle (often 90 degrees, but any bend angle is possible) while preserving the same cross-section. Such pipe elbows may be referred to herein as standard pipe elbows (SPEs).

Pipe elbows, like all internal flow fluidic elements (e.g., pipes, valves, contractions, expansions,) have effects on the pressure of the fluid that they transfer. Contractions tend to induce pressure drops in flows because the narrower flow area forces increases in flow velocity. This increases dynamic pressure of the flow, and per Bernoulli's principle, static and dynamic pressure are conserved. This means the absolute pressure tends to drop through a contraction. Conversely, expansions tend to increase the absolute pressure of the flow. Pressure changes associated with contractions and expansions of fluidic elements may be "recoverable", meaning that the pressure drop associated with a contraction can be recovered by an expansion to the original sized flow cross-section.

However, all fluidic elements also have effects that can dissipate useful fluidic flow energy and turn it into heat. This happens by frictional interactions between the solid wall of the fluidic element and the fluid, as well as due to mixing of the fluid itself within the device. This loss of useful energy is realized in the system as an "irrecoverable" pressure drop. All fluidic elements with flow have irrecoverable pressure drops. Pumps commonly are used to move fluids through internal flow fluidic elements. Irrecoverable pressure drops in internal flow fluidic elements are the reason why pumps require energy input in order to drive the flow. If irrecoverable pressure drop can be reduced, the energy required to drive the flow is proportionately reduced.

Standard pipe elbows have three contributing causes of irrecoverable pressure drop. First is surface friction. This is the frictional interaction of the fluid with the wall of the pipe elbow.

Second is secondary flows. "Secondary flows" refer to flows that occur within the primary flow but are moving in different directions. In standard pipe elbows, fluid entering the pipe elbow near the inside of the turn (the "intrados") will have a shorter path to take around the turn than fluid entering near the outside of the turn (the "extrados"). Centrifugal forces tend to push the fluid toward the outside of the bend. Secondary flows in pipe elbows are caused by an imbalance in centrifugal and frictional forces acting on the fluid. The secondary flow structures that arise from bending a flow are known as Dean vortices.

Third is flow separation. As a fluid traverses a standard pipe elbow, it is subject to inertia in making a turn. This inertia tends to throw fluid toward the outside edge of the pipe elbow. The fluid on the inside edge forms an eddy that recirculates and does not provide useful cross-sectional area to conduct fluid through the conduit. In fact, an eddy tends to form in which low speed fluid circulates at the downstream end of the standard pipe elbow near the intrados. The flow separation, thus, functionally pinches the flow and induces irrecoverable pressure drop.

The heretofore described fluid mechanical issues of standard pipe elbows accrue into negative impacts for the system in which the Standard Pipe Elbow is placed. These are: 1) excessive energy consumption (i.e., pressure loss) in the pipe elbow, 2) downstream swirl resulting in energy loss downstream of the pipe elbow and poorly conditioned flow that can negatively impact the performance of other fluid conduit devices such as flow meters, 3) wall erosion causing entrained system debris and excessive maintenance cycles and 4) cavitation which can further damage the wall and create unnecessary noise in the fluid conduit.

Some previously proposed solutions have attempted improvements in several of these categories. Others have attempted improvements in only one category and possibly detriments in other categories. Some proposed solutions rely on vanes inside the pipe elbow. These are undesirable because they present stagnation points that can snag entrained debris or erode the wall. They also increase difficulty and cost of manufacture and inhibit through-pipe maintenance. Some proposed solutions rely on reshaping the flow in the pipe elbow, but do so in undesirable ways. For example, some designs will consume additional flow volume that is not actually available for use (often at the extrados or the sides of the elbow). This is unacceptable because an improved pipe elbow that takes up more space than the pipe itself cannot, in some cases, be properly emplaced. If such additional space were available, then it should have been spent on a larger diameter pipe, and associated elbow, which would have yielded better results in the form of reduced irrecoverable pressure drop and energy consumption. Proposed solutions that reshape the flow by adding additional flow space near the extrados since there is relatively more space available there, are undesirable since this actually further disturbs the flow by adding an expansion and contraction, and also de-conditions the flow relative to standard pipe elbows in the bend. Some proposed solutions reshape the cross-section of the elbow and narrow the distance from the intrados to the extrados in the elbow as a means of reducing the Dean number and thus the intensity of the Dean vortices. Although, this can be an effective technique, it generally introduces two undesirable features of 1) making the elbow poke out on the sides and consuming additional space, and 2) creating a narrow interior space that poses clog risks. In general, proposed solutions that reshape the flow have not been concerned with conserving (that is, maintaining) cross-sectional area inside the pipe elbow. This is a problem because this effectively introduces expansions and contractions into the elbow that induce new irrecoverable pressure losses that were not present in standard pipe elbows. While standard pipe elbows conserve cross-sectional area inside the pipe elbow, they are subject to the previously-described problems.

A need, therefore, exists for an improved pipe elbow that: 1) reduces pressure drop; 2) conditions the flow (i.e., provides straighter, smoother flow than standard pipe elbows); 3) reduces erosion; 4) reduces or eliminates cavitation; 5) does not have vanes to pose snag risks; 6) does not have narrow points to pose clog risks; 7) does not consume additional space; 8) preserves the cross-sectional area (which reduces irrecoverable pressure drop); 9) allocates flow space appropriately to disincentivize secondary flows; and 10) smoothly adjusts curvature of the elbow to avoid sudden changes in direction of the flow.

SUMMARY OF THE INVENTION

The present invention relates generally to pipe elbows and, more particularly, to pipe elbows having an improved interior configuration for more smoothly turning the flow of fluids through the pipe elbow.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a pipe elbow having an interior surface, an exterior surface, an interior, a centerline, and a bend having an axis of rotation and an apex is provided. The interior surface of the bend is defined by an inside curve and an outside curve, and intrados and extrados at a given cross-section of the bend. The pipe elbow comprises:

an inlet (or first end) portion having an interior cross-section with a first cross-sectional configuration and a first cross-sectional area;

an outlet (or second end) portion having an interior cross-section with a second cross-sectional configuration and second cross-sectional area; and an intermediate portion joined to the inlet and outlet portions between the inlet portion and the outlet portion, wherein the intermediate portion forms the bend, and the intermediate portion has an interior cross-section with a third cross-sectional area, wherein:

the interior cross-section of the intermediate portion is in the configuration of a closed figure which has a first region between the centerline and the intrados and a second region between the centerline and the extrados, wherein the first region has a larger cross-sectional area than the second region; and the first, second, and third cross-sectional areas are substantially the same (or equal in size) while the configuration/shape of the third cross-sectional area is different from the configuration/shape of the first and second cross-sectional areas.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
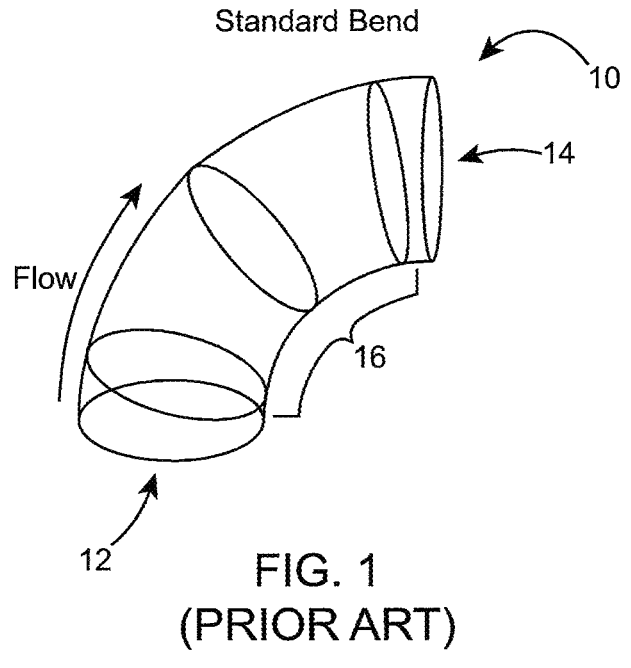
FIG. 1 is a schematic perspective view of a standard pipe elbow with a constant circular cross section.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to pipe elbows and, more particularly, to pipe elbows having an improved interior configuration for more smoothly turning the flow of fluids through the pipe elbow.

Definitions

The term "apex" ("AP"), as used herein, refers to the point along the centerline of the pipe elbow, and its associated cross-section, at which the bend is half-completed. In the case of symmetrical pipe elbows, it is the point along the flow path that is midway between the inlet and the outlet of the bend.

The term "axis of rotation" ("AR"), as used herein, refers to the axis about which a given cross-section is rotated. The distance from the centerline at the cross-section to the axis of rotation is known as the "radius of curvature" of the pipe elbow at that cross-section and its inverse is known as the "curvature" of the pipe elbow at that cross section, as commonly defined in common mathematical definitions of "radius" and "curvature".

The term "axial direction" ("AD"), as used herein, refers to a direction co-axial (parallel) with the axes of rotation of the cross-sections which produce the shape of the pipe elbow. More colloquially, it is a direction that measures what is generally thought of as a "height" direction when considering a pipe elbow, if the pipe elbow is placed on a horizontal surface with the inlet centerline and the outlet centerline in a plane parallel to the horizontal surface.

The term "bend", as used herein, refers to the curved portion of the pipe elbow. This is distinguishable from any straight portions of the pipe elbow that may exist that include the inlet and outlet of the pipe elbow and portions adjacent thereto.

The term "centerline" ("CL"), as used herein, refers to the path through which the pipe elbow traverses in its course from the inlet to the outlet, proceeding through the turn that the elbow accomplishes.

The term "cross-section", as used herein, refers to the shape of pipe elbow when cut crosswise to the centerline of the pipe elbow.

The term "extrados" ("E"), as used herein, refers to the point on a cross-section that is furthest from the axis of rotation. Otherwise known as the "outside of the elbow".

The term "intrados" ("I"), as used herein, refers to the point on a cross-section that is closest to the axis of rotation. Otherwise known as the "inside of the elbow".

The term "radial direction" ("RD"), as used herein, is strictly defined for a given cross-section and refers to the direction radiating out from the axis of rotation for that cross-section and moving in the direction of, and through the cross-section. The radial axis ("RA") is the line through which the intrados, extrados, and axis of rotation, all pass.

The term "radial-axial plane" ("RAP"), as used herein, refers to a plane that contains both the radial axis and axial axis for a given cross-section. The radial-axial plane is also the cross-section. The radial-axial plane RAP may also be referred to as the radial-axial (p-a) plane in the coordinate system shown in several of the drawing figures.

The term "zonal direction" ("ZD"), as used herein, refers to a direction parallel to the centerline CL.

The term "zonal-axial plane" ("ZAP"), as used herein, refers to a curvilinear plane that follows the centerline and contains both the zonal axis ZA and axial axis AA for a given cross-section.

The term "zonal-radial plane" ("ZRP"), as used herein, refers to a plane that contains both the zonal axis and radial axis for a given cross-section.

FIG. 1 shows a standard pipe elbow (SPE) 10 with a constant circular cross section. The pipe elbow 10 has an inlet 12, an outlet 14, and a bend 16. The ends of the pipe elbow at the inlet 12 and outlet 14 are generally joined to straight pipe sections. In this pipe elbow 10, the apex AP is at the center of the bend, and is not a point of maximum curvature since the curvature is constant throughout the entire elbow. The standard pipe elbow 10 is subject to the problems described in the Background section above.

Figure 2:
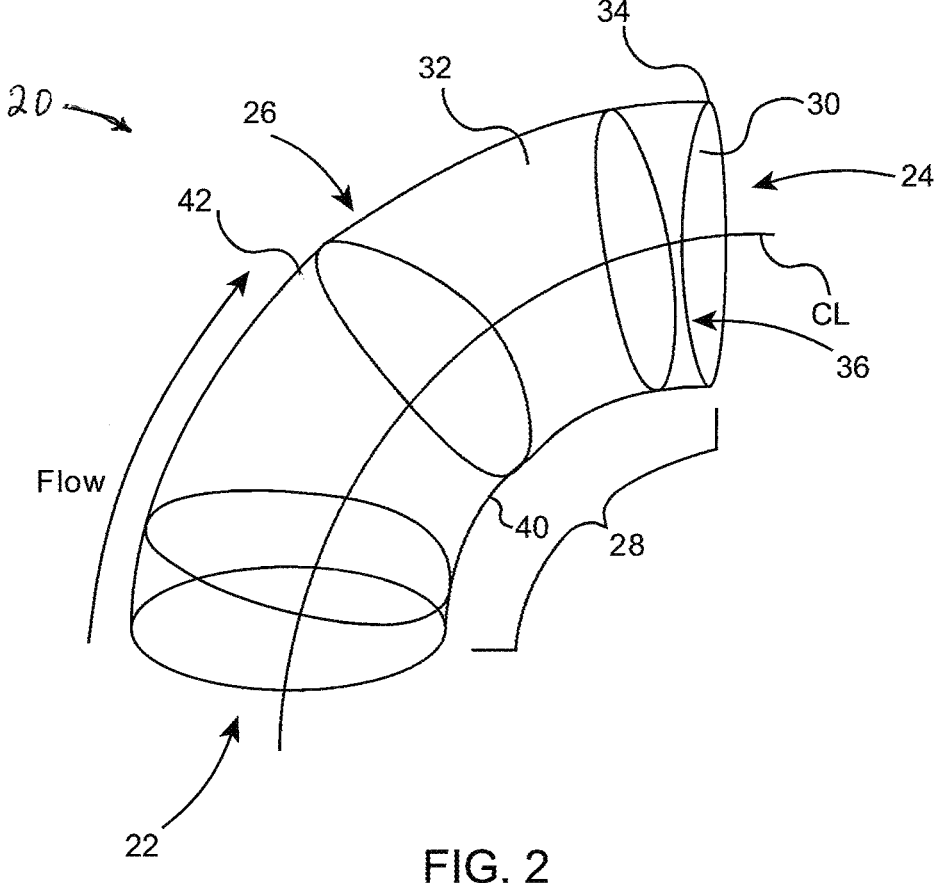
FIG. 2 is a schematic side perspective view of one embodiment of the improved pipe elbow according to the present invention.

FIG. 2 shows one embodiment of an improved pipe elbow 20 according to the present invention. The improved pipe elbow 20 may be referred to herein as a "coordinated flow" pipe elbow (or "CFPE") since its shape is designed to coordinate the flow of fluid through the elbow, reducing the tendency for the fluid to create secondary flows where the fluid "tumbles" over itself, and also reducing flow separation. The term "fluid", as used herein, refers to masses that can flow and includes but is not limited to liquids, gases, supercritical fluids, particulate flows, and plasmas.

The pipe elbow 20 can be used as a plumbing fitting, an HVAC fitting, or in any place where pipe elbows are currently used. The pipe elbow 20 can form a bend of any angle ranging from greater than 0° (or 0.1°) to less than 360° in the plane of its longitudinal centerline. Examples of bends, therefore, include but are not limited to 45° bends and 90° bends.

The pipe elbow 20 comprises a first end portion (which may be an inlet portion 22), a second end portion (which may be an outlet portion 24), and an intermediate portion 26 that forms a bend 28. The inlet portion 22 has an inlet opening 22A and the outlet portion 24 has an outlet opening 24A. The pipe elbow 20 has a centerline CL. The pipe elbow 20 has an interior surface 30, an exterior surface 32, and side walls 34 that have a thickness and that define the interior and the exterior surfaces 30 and 32, respectively. The pipe elbow 20 has an interior 36 through which fluid may flow. The bend 28 has an inside (or "inner") portion 40 that defines an inside curve and an outside (or "outer") portion 42 that defines an outside curve. In this pipe elbow, 20 the apex AP is the point along the centerline of maximum curvature of the pipe elbow.

The inlet portion 22 and the outlet portion 24 may comprise straight (that is, rectilinear) portions at the ends of the pipe elbow 20. The inlet portion 22 and the outlet portion 24 can be of any suitable length. In some cases, the inlet portion 22 and the outlet portion 24 may have such short lengths that the centerline of the pipe elbow 20 starts assuming a curved configuration immediately inward of the inlet and outlet openings 22A and 24A.

The inlet portion 22 and the outlet portion 24 can have any suitable interior and exterior cross-sectional configurations. The inlet and outlet 22A and 24A cross-sections are intended to match the typically straight pipe cross-sections to which the pipe elbow 20 will be joined. The straight pipe cross-sections to which the pipe elbow 20 will be joined are very frequently circular, but can also be square, triangular, polygonal, rectangular, ellipsoidal, or any other closed cross-section. Therefore, the inlet portion 22 and the outlet portion 24 can be provided with any of these interior and exterior cross-sectional configurations. The inlet portion 22 and the outlet portion 24 may be further provided with flanges or features that contribute to provide joints for joining the pipe elbow 20 to these other pipes.

The inlet portion 22 has an interior cross-section with a first cross-sectional configuration and a first cross-sectional area A1. The outlet portion 24 has an interior cross-section with a second cross-sectional configuration and a second cross-sectional area A2. In some cases, it may be desirable for the cross-sectional shape and size of the inlet portion 22 and the outlet portion 24 to be the same so that the pipe elbow 20 is symmetric. This permits either end to be installed as the inlet or the outlet. In other cases, it may be desirable for the cross-sectional shape and/or size of the inlet and outlet 22 and 24 to be different so that the pipe elbow 20 is asymmetric. In such cases, the pipe elbow 20 may have an arrow or other mark thereon indicating the proper direction of installation to match the intended flow direction.

FIG. 2 shows that the intermediate portion 26 is joined to the inlet and outlet portions between the inlet portion 22 and the outlet portion 24. The intermediate portion 26 is typically integrally formed with the inlet portion and the outlet portion. There does not need to be a precise boundary or demarcation of the transition between the inlet portion 22 and outlet portion 24 and the intermediate portion 26. In some cases, the inlet portion 22, the intermediate portion 26, and the outlet portion 24 of the pipe elbow could be considered to smoothly transition. The intermediate portion 26 forms the bend 28 and may have an interior cross-section configuration that is different from that of the inlet 22A and the outlet 24A. The intermediate portion 26 has an interior cross-section with a third cross-sectional area A3.

Figure 3:
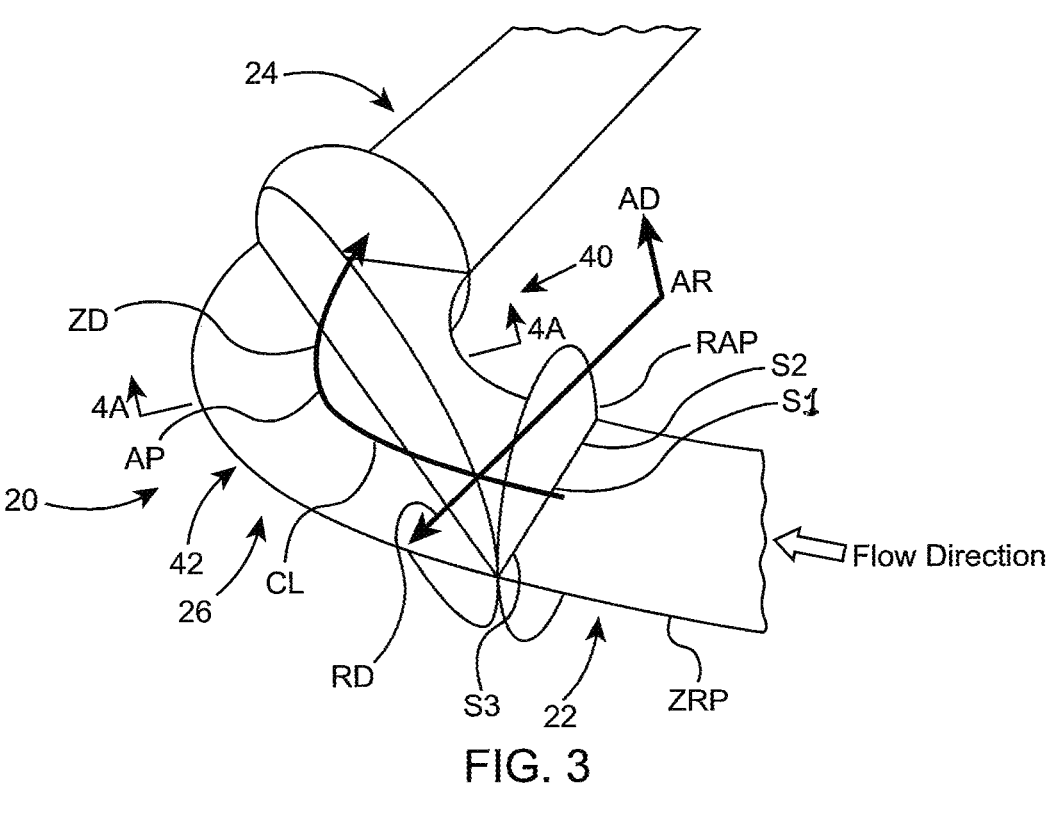
FIG. 3 is a partially cut away schematic side perspective view of the improved pipe elbow according to the present invention showing the coordinate system overlaid on the same.
Figure 4A:
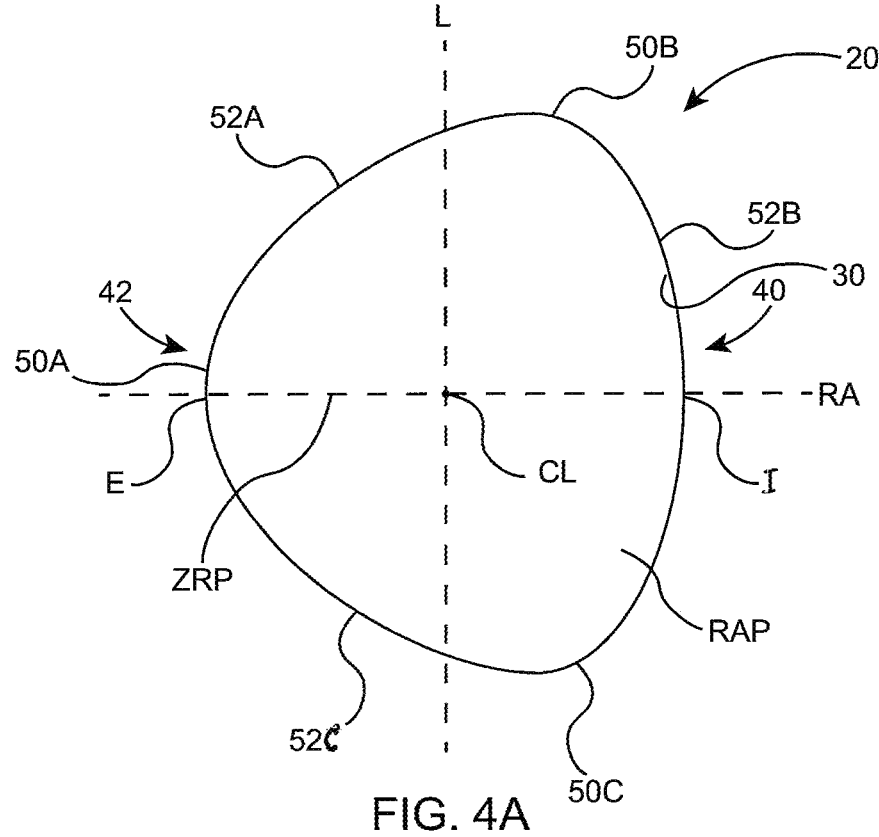
FIG. 4A is a diagram showing the cross-sectional shape of the interior of one embodiment of the coordinated flow pipe elbow of the present invention at the apex of the bend taken along line 4A-4A of FIG. 3 in which the various parts of the cross-section are designated.

FIG. 3 is a partially cut away schematic side perspective view of the improved pipe elbow 20 according to the present invention showing various components of the coordinate system defined above overlaid on the same. FIG. 4A is a diagram showing the cross-sectional shape of the interior of one non-limiting embodiment of the coordinated flow pipe elbow 20 at the apex of the bend in which the various parts of the cross-section are designated.

The intermediate portion 26 is configured so that more volume is allocated towards the inside 40 of the bend 28 and volume is decreased at the outside 42 of the bend 28. Volume is increased at the inside 40 of the bend so that the fluid at the inside does not have to speed up and volume is decreased at the outside of the bend so that the fluid at the outside does not have to slow down. This reduces the tendency for the fluid to circulate from the inside to the outside 42 of the bend. The shape of the cross-section coordinates the flow such that fluid parcels entering the pipe elbow 20 at different places along the line from the intrados I to the extrados E also leave the outlet at the same time. This can be thought of as being analogous to laned track races for runners. The runners on the inside track start further back such that everyone runs the same distance despite the inside and outside tracks having different curvatures and path lengths through the bend (however, the way the pipe elbow accomplishes this goal is different).

The deformed shape of the cross-section of the intermediate portion 26 is calculated so as to preserve differential volume (i.e., area) in the zonal-axial plane ZAP near the intrados I. In the case of SPE's, the flow is pinched together by advective acceleration, so more space is allocated in the axial (colloquially, "vertical") direction to coordinate the flow. Similarly, height is reduced near the extrados E to discourage advective deceleration in the zonal-axial plane.

Figure 5A:
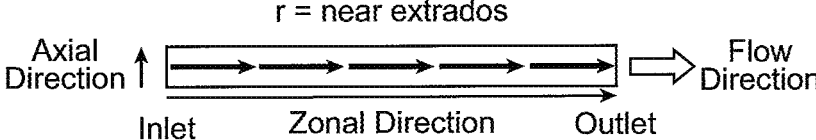
FIG. 5A is a schematic diagram showing the flow velocity at a longitudinal cross-section taken adjacent the extrados of a standard pipe elbow with a constant circular cross section.
Figure 5B:
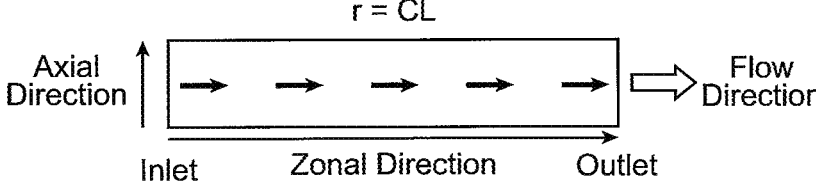
FIG. 5B is a schematic diagram showing the flow velocity at a longitudinal cross-section taken along the centerline of a standard pipe elbow.
Figure 5C:
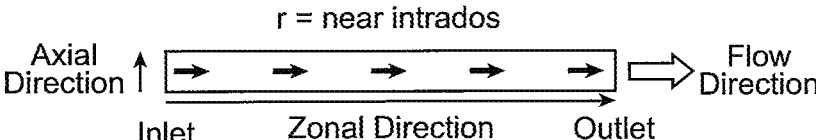
FIG. 5C is a schematic diagram showing the flow velocity at a longitudinal cross-section taken adjacent the intrados of a standard pipe elbow with a constant circular cross section.
Figure 6A:
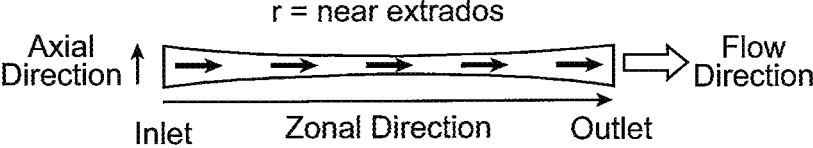
FIG. 6A is a schematic diagram showing the flow velocity at a longitudinal cross-section taken adjacent the extrados of a coordinated flow pipe elbow.
Figure 6B:
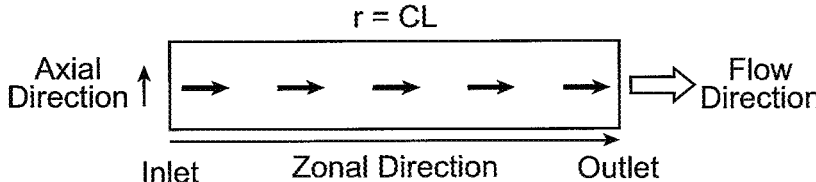
FIG. 6B is a schematic diagram showing the flow velocity at a longitudinal cross-section taken along the centerline of a coordinated flow pipe elbow.
Figure 6C:
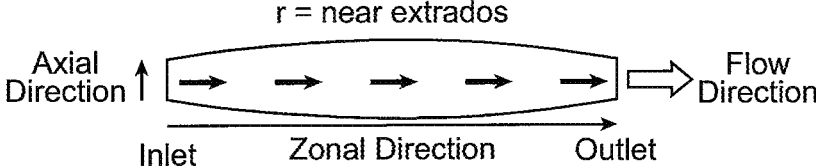
FIG. 6C is a schematic diagram showing the flow velocity at a longitudinal cross-section taken adjacent the intrados of a coordinated flow pipe elbow.

This concept is shown schematically by comparing FIGS. 5A-5C with FIGS. 6A-6C. FIGS. 5A-5C show the flow velocity from the inlet to the outlet of a prior art standard pipe elbow with a constant circular cross section. FIG. 5A shows the flow velocity at a longitudinal cross-section taken adjacent the extrados of a standard pipe elbow. FIG. 5B shows the flow velocity at a longitudinal cross-section taken along the centerline of a standard pipe elbow. FIG. 5C shows the flow velocity at a longitudinal cross-section taken adjacent the intrados of a standard pipe elbow with a constant circular cross section. As shown by the length of the arrows representing the velocity, in FIG. 5A, the fluid moves at the greatest velocity near the extrados. In FIG. 5B, the fluid moves at a slower intermediate velocity along the centerline of the standard pipe elbow. FIG. 5C shows that the fluid moves at the lowest velocity near the intrados.

FIGS. 6A-6C show the flow velocity from the inlet to the outlet of a coordinated flow pipe elbow (CFPE) according to the present invention. FIG. 6A shows the flow velocity at a longitudinal cross-section taken adjacent the extrados of a coordinated flow pipe elbow. FIG. 6B shows the flow velocity at a longitudinal cross-section taken along the centerline of the coordinated flow pipe elbow. FIG. 6C shows the flow velocity at a longitudinal cross-section taken adjacent the intrados of the coordinated flow pipe elbow. As shown by the length of the arrows representing the velocity, in the CFPE the fluid is moving at substantially the same (or exactly the same) velocity at all locations across the width of the pipe elbow.

Figure 4B:
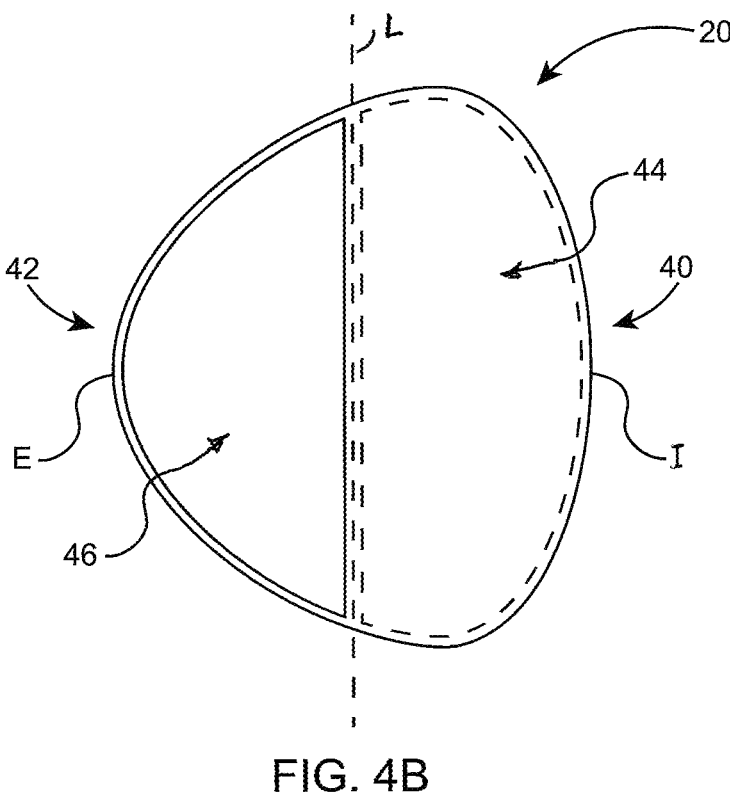
FIG. 4B is a diagram showing the same cross-sectional shape in FIG. 4A which shows the larger cross-sectional area adjacent the inside of the bend and the smaller cross-sectional area adjacent the outside of the bend.

The configuration of the third cross-section (of the interior of the intermediate portion 26) is different from that of the first and second cross-sections of the inlet portion 22 and the outlet portion 24. The intermediate portion 26 can have any suitable interior cross-sectional configuration that increases the volume or cross-sectional area at the inside 40 of the bend 28 and decreases the volume or cross-sectional area at the outside 42 of the bend. FIG. 4A shows one non-limiting embodiment of a cross-section of the interior surface of the pipe elbow 20. FIG. 4A shows that the plane ZRP passes through the centerline CL. This plane ZRP will contain all points along the entire length of the centerline of the pipe elbow. With the pipe elbow 20 in the orientation shown in FIG. 4A, the plane ZRP divides the cross-section into a top half and a bottom half. FIG. 4B shows that a line L that passes through the centerline CL and is perpendicular to plane ZRP divides the cross-section into an inner first region 44 at the inside of the bend 28 and an outer second region 46 at the outside of the bend. The interior cross-section of the intermediate portion 26 is in the configuration of a closed figure in which the inner first region 44 between the centerline CL and the intrados I has a larger cross-sectional area than the second region 46 between the centerline CL and the extrados E.

The first, second, and third cross-sectional areas A1, A2, and A3 (of the inlet portion 22, the outlet portion 24, and the intermediate portion 26, respectively) may be substantially the same (or equal) in size. In many cases, it is desirable to preserve the (that is, maintain the same) overall cross-sectional area of the whole cross-section while shifting some of the area radially inwards. In such cases, it is desirable for the difference between the cross-sectional area of the intermediate portion 26 and the cross-sectional area of the inlet portion 22 and/or outlet portion 24 to be less than or equal to about 1%, or any amount less than 1%, such as less than or equal to about 0.3%. However, it should be understood that, in other cases, the cross-sectional area of the intermediate portion 26 may only be substantially conserved. In these latter cases, the difference between the cross-sectional area of the intermediate portion 26 and the cross-sectional area of the inlet portion 22 and/or outlet portion 24 to be less than or equal to about 10%.

Figure 4C:
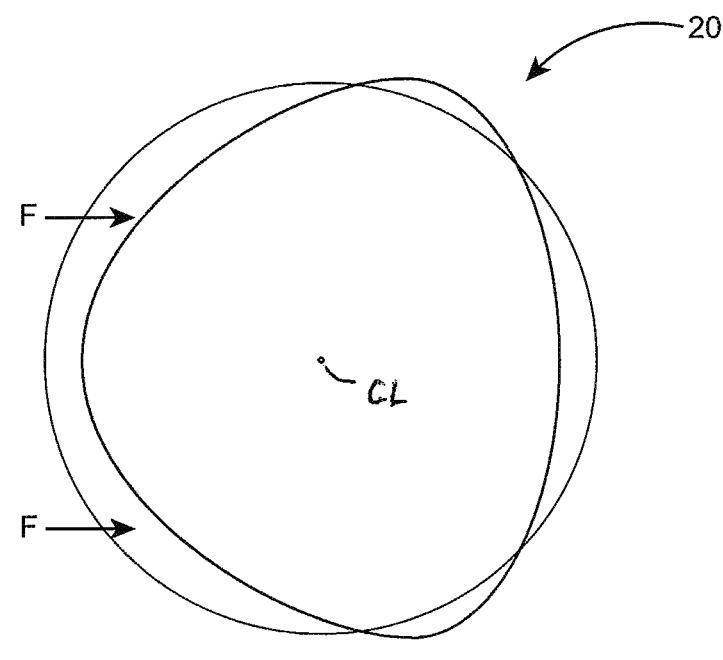
FIG. 4C is a diagram showing the same cross-sectional shape in FIG. 4A which shows the concept of how a circular cross-section is deformed to produce the non-circular cross-sectional shape.

The way that area is "shifted radially inwards" is that the height of the cross-section is increased adjacent the inside of the bend and decreased in the axial direction in order to realize the radial inward shift of the cross-sectional area. The configuration of the intermediate portion 26 of the pipe elbow 20 in a manner that shifts some of the area radially inwards while conserving the interior cross-sectional area can be thought of as being conceptually similar to what would occur if one was making the pipe elbow out of PLAY-DOH® modeling compound. FIG. 4C shows how the cross-section of the PLAY-DOH® modeling compound pipe elbow would be displaced if force was applied to the same in the areas shown with arrows F.

The configuration of the interior cross-section of the intermediate portion 26 depends on the cross-sections of the inlet and outlet. FIGS. 2 to 4C show that, in some cases, the first cross-sectional configuration of the inlet 22 may be circular and the second cross-sectional configuration of the outlet 24 may be circular. In such cases, the interior cross-section of the intermediate portion 26 is in the configuration of a non-circular curvilinear figure. In some cases, as shown in FIG. 4A, the intermediate portion 26 that forms the bend 28 may have an interior cross-section in the configuration of a modified triangle with three rounded vertices 50A, B, and C and convexly rounded sides 52A, B, and C that are located between the rounded vertices. In the later cases, interior cross-section of the intermediate portion 26 may be oriented so that one of the rounded vertices 50A is aligned adjacent to the outside portion 42 of the bend 28, and two of the rounded vertices 50B and 50C are aligned adjacent to the inside portion 40 of the bend.

Figure 7A:
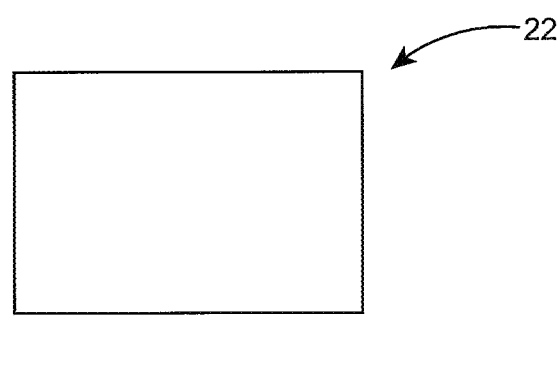
FIG. 7A is a diagram showing the cross-section of the inlet opening of an alternative pipe elbow which has a rectangular configuration.
Figure 7B:
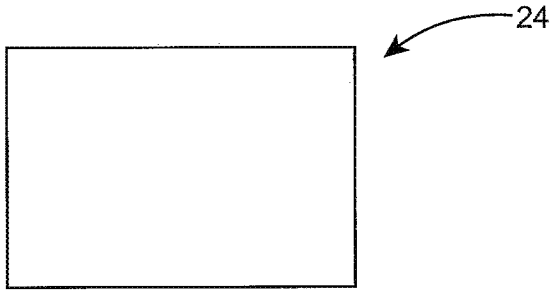
FIG. 7B is a diagram showing the cross-section of the outlet opening of an alternative pipe elbow which has a rectangular configuration.
Figure 7C:
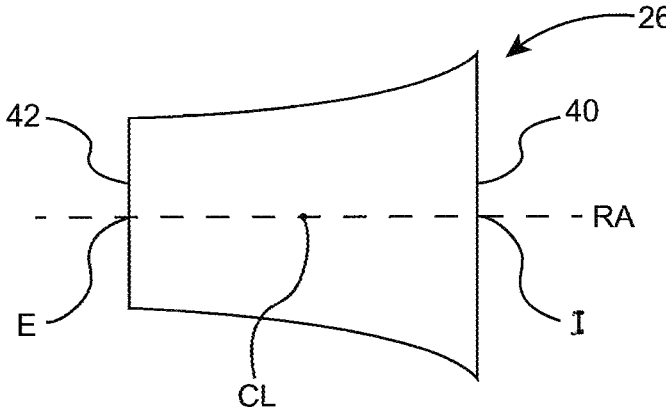
FIG. 7C is a diagram showing the cross-section at the apex of the bend of the alternative pipe elbow which has a rectangular inlet and outlet configuration.

FIGS. 7A to 7C show that, in other cases, such as when the inlet 22 and outlet 24 have non-circular configurations, the configuration of the interior cross-section of the intermediate portion 26 is not limited to the curvilinear figure shown in the previous drawing figures. For example, as shown in FIGS. 7A and 7B, the configuration of the inlet 22 and outlet 24 may be rectangular. FIG. 7C shows that, in this case, the intermediate portion 26 has a configuration in which a portion of the cross-sectional area is shifted radially inwards. This forms a cross-section that has rectilinear segments that form the inside and outside portions, with the rectilinear inside portion having a greater height than that of the outside portion. The top and bottom of the cross-section are tapered so that they increase in height from the outside to the inside portions of the cross-section. The segments that form the top and bottom of the cross-section may comprise rectilinear portions and curvilinear portions. In this case, the curvilinear portions are located adjacent the inside 40 of the intermediate portion 26 of the pipe elbow. The curvilinear portions along the top and bottom of the cross-section may be concave when viewed from outside the pipe elbow.

The configuration of the interior cross-section of the intermediate portion 28 can vary along the path of the centerline CL. The configuration of the interior cross-section can be proportionately deformed incrementally while traversing the path of the centerline CL through the pipe elbow in such a way as to reduce energy consumption by coordinating the flow. The deformation of the cross-section is accomplished by applying a multiplicative factor to the undeformed shape to adjust the shape appropriately for each point along the centerline CL. The cross-section at each point is located such that the centroid C of the undeformed section is on the centerline CL.

The interior surface 30 and the exterior surface 32 of the pipe elbow 20 may, in some cases, have substantially the same cross-sectional configuration, with the exterior surface having a larger version of the interior surface cross-sectional configuration. Alternatively, the interior and exterior of the pipe elbow 20 may have different cross-sectional configurations, provided that the interior surface has the properties described herein. For example, as shown in FIG. 2, the interior surface 30 may have at least some cross-sections along the length of the non-linear portion of pipe elbow 20 that are non-circular. In some cases, the exterior surface 32 at the same location may have the same non-circular cross-sectional configuration. In such a case, the thickness of the side walls 34 at that location may be uniform around the periphery of the pipe elbow at each given cross-section. In other cases, the exterior surface of the pipe elbow 20 at may have a different cross-sectional configuration a given location. For example, the interior cross-section can be non-circular, and the exterior cross-section may be circular. In such cases, the thickness of the side walls 34 at that location may vary around the periphery of the pipe elbow 20 at each given cross-section.

The centerline CL of a pipe elbow passes through the centroid C of the inlet and outlet cross-sections. A pipe elbow can be configured so that any number of different centerlines could be used to connect a defined inlet and outlet. The centerline CL of the CFPE 20 smoothly turns the flow rather than abruptly turning the flow as in standard pipe elbow. The abrupt turning of the flow in standard pipe elbow (SPE) can be thought of as analogous to the situation in which a person is driving a car on a straight road and then suddenly encounters a fixed radius turn. If there is no transition from movement in a straight line and the fixed radius curve, the abrupt change of direction will cause the driver to experience a sudden jerk. The centerline CL of the CFPE 20, on the other hand, can be described as a curve that is defined by having a variable radius of curvature where the radius of curvature starts at zero (to match the straightness of the straight inlet pipe), smoothly increases to a finite value of curvature, and then ramps back down toward the outlet in a similar way it did during the ramp up. The axis of rotation AR is, thus, different for each cross-section of the CFPE 20. This differs from standard pipe elbows, in which the axis of rotation is fixed at the same location for all cross-sections of the pipe elbow. This enables a smoother turn and better performance for CFPEs.

The coordinated flow pipe elbow 20 may, therefore, have a certain class of centerlines (namely, finite-length centerlines that smoothly turn the flow and smoothly connect to the centerline of the (straight) pipes that may be connected to the inlet 22 and outlet 24). The term "smooth" may be described herein in fluid mechanical terms as having no sudden changes that alter the flow. The term "smooth" can also be described in its mathematical sense which is to refer to a function that can be differentiated an arbitrary (infinite) number of times and yet never have a singularity (that is, while maintaining continuity). This can be contrasted with the case of a circle tangent to a straight line (i.e., in an SPE), only one derivative can be applied before a singularity is reached.

A property desired for the centerline CL curve is that it complete its turn in a finite distance. There are many families of smooth mathematical curves that could be used as a centerline, but fewer of them that complete the turn in a finite difference. This mathematical principle is known as "compact support". Functions that are both smooth and have compact support are known as bump functions. Several bump functions would work, but the bump function with equation:

$$1/R = e^{1-\xi^2}$$

is selected for its simplicity, ease of definition (no "if/then" statements), and symmetry (i.e., there is no need to define a unique inlet and outlet end of an CFPE using this bump function. This equation may be described as one minus the unit parabola, all taken as the exponent of Euler's number, e. The lefthand side of the equation indicates that the radius of curvature, R, is what the bump function is defining. At the inlet and outlet, the radius of curvature is infinite, which is a statement that the ends of the CFPE is straight, just like the pipes it connects to. $\xi$ is the variable indicating progress along the path. The equation is defined with $\xi=0$ at the apex of the turn.

Next, the cross-sectional shape a of the pipe elbow can be defined in the radial-axial ($\rho$-a) plane. First, the cross-sectional shape of a unit circle displaced from the origin (i.e., the location {0,0}) by a factor of R (the radial distance to the axis of rotation) is:

$$a = \begin{cases} \sqrt{r^2 - (\rho - R)^2} \\ -\sqrt{r^2 - (\rho - R)^2} \end{cases}$$

where r is the radius of the unit circle, and $\rho$ is the radial coordinate. The top portion on the right side of the equation represents the top half of the circle, and the bottom portion on the right side of the equation represents the bottom half of the circle.

Figure 8:
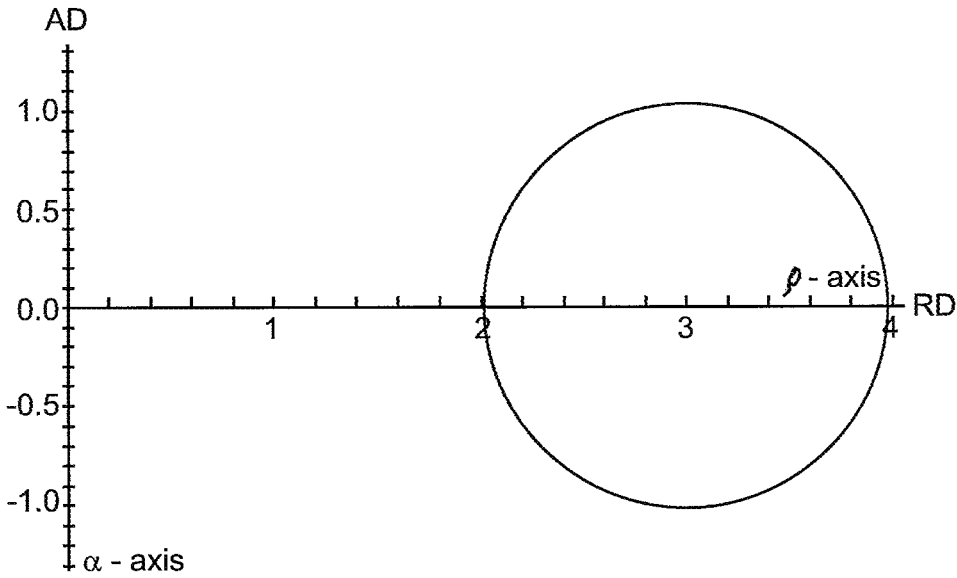
FIG. 8 is a diagram showing the cross-sectional shape of a unit circle displaced from the origin (i.e., the location {0,0}) by a factor of R=3.

And when r=1 and R=3, it produces a circular shape like that shown in FIG. 8. The line $\rho=0$ (i.e., the a-axis) indicates the axis of rotation at this point $\xi$ along the centerline of the CFPE. This is the instantaneous axis of rotation of the CFPE and thus is an analogue to the axis of rotation for an SPE with the exception that there is only one axis of rotation for the entire SPE and that, for CFPE, the location of the axis of rotation varies along the centerline CL from inlet to outlet.

Now, multiply that "base cross-section" (it may also be called the "port cross section" as it is the cross section at the inlet and outlet ports) by the multiplicative inverse function multiplied by a factor of the radial distance to the axis of rotation, R.

$$a = \frac{R}{\rho}$$

Figure 9:
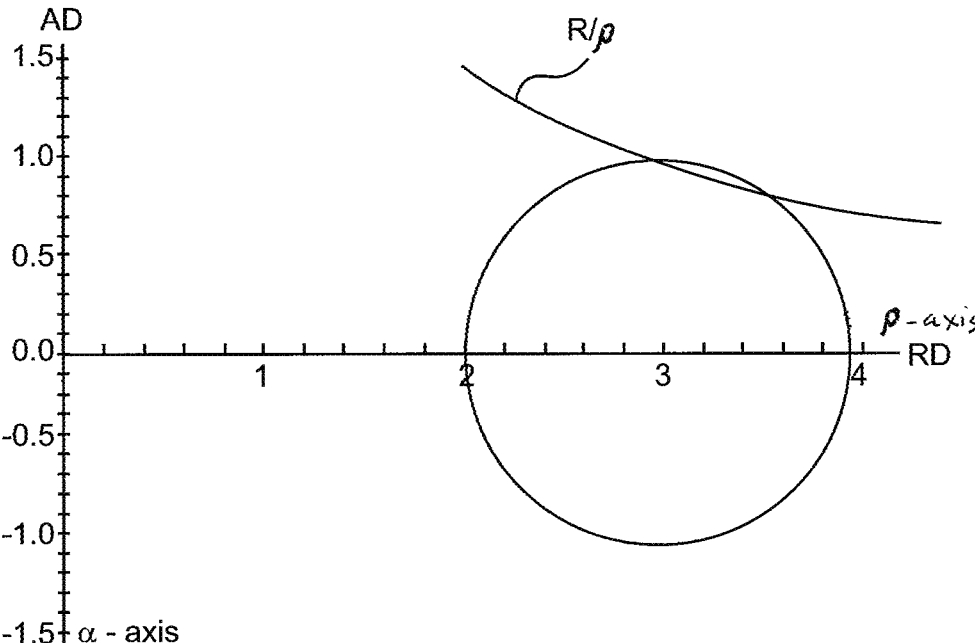
FIG. 9 is a diagram showing the influence of the multiplicative R/ρ curve overlaid on FIG. 9 to provide relatively more volume at the intrados and relatively less volume at the extrados.

FIG. 9 shows that overlaid on the previous figure, FIG. 8, the influence of the multiplicative R/$\rho$ curve is to provide relatively more volume at the intrados and relatively less volume at the extrados. The first shape in FIG. 9 is the undeformed inlet port shape (a circle). The second shape is the R/rho curve which is the multiplicative factor by which the shape of the cross section is adjusted (deformed) in order to make the improved cross section of the CFPE at that location along the centerline.

Figure 10:
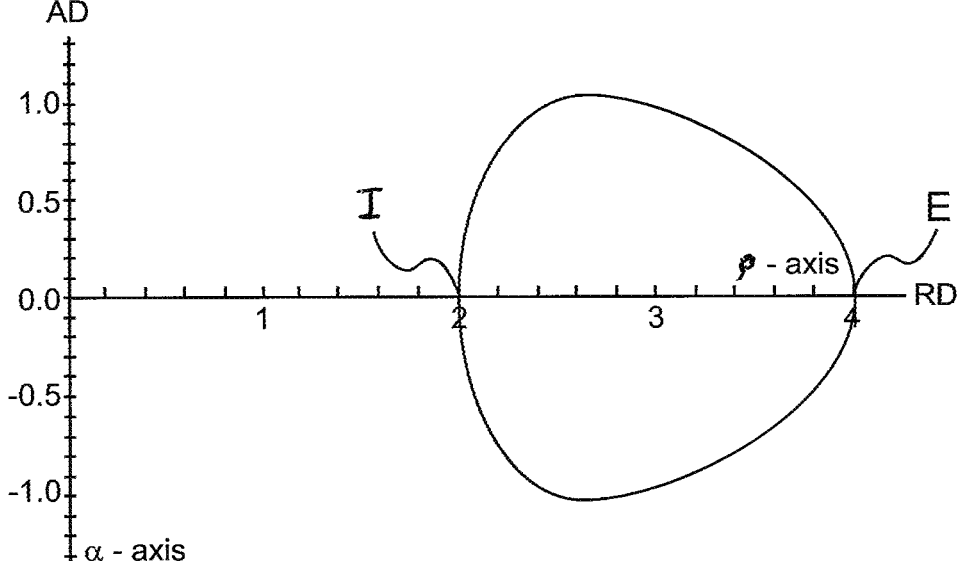
FIG. 10 is a diagram showing the cross-sectional shape of the interior of one embodiment of the coordinated flow pipe elbow of the present invention at the apex of the bend.

If the two shapes in FIG. 9 are multiplied together, the result is the new coordinated flow pipe elbow (CFPE) cross cross-sectional shape shown in FIG. 10.

R/$\rho$ is a very intentional curve to use as a multiplicative factor because it grows/shrinks the flow's area in the "axial direction" (that is, the direction parallel to the axis of rotation, the a-axis) exactly to match the difference in path length that varies linearly along the radial direction (that is, the direction parallel to the axis from the axis of rotation to the center of the cross section, the $\rho$-axis). Thus, the new cross-section allocates extra room in the axial direction at the intrados I to make up for the fact that the shorter path length there means that there is not enough volume in the SPE near the intrados. Likewise, it removes room in the axial direction at the extrados E to account for the fact that there is a longer path length there which means that there is too much volume in the SPE near the extrados. Thus, the CFPE cross section preferentially shifts volume inwards towards the intrados I to facilitate the turn. Moreover, it does it in such a way as to discourage secondary flows in the radial direction by preserving volume in the zonal-axial plane. The zonal axis ZA is defined as the direction parallel to the centerline at that point in the flow path. The zonal axis is into and out of the page in figures showing the cross-section. This shape coordinates the flow and gives rise to the name Coordinated Flow Pipe Elbow (CFPE). The phrase "coordinates the flow" means that if two fluid parcels enter the turn at different locations along the radial axis, they will tend to exit the turn at the same time in the CFPE. In contrast, in standard pipe elbows, such fluid parcels will tend to exit the turn at different times.

The shape modifier function is inverse with the variable $\rho$ because the path length through a streamline running through a circular bend SPE is linearly proportional to the distance of that streamline from the axis of rotation. This is the distance $\rho$. This path length is a linear term with the differential volume of that streamline. Thus, the 1/$\rho$ term in the shape modifier cancels out the linear term $\rho$ in a way that coordinates the flow.

Thus, the equation for the cross-section of the intermediate portion, when the port (inlet and outlet) cross-section is circular is:

$$a = \begin{cases} \frac{R(\xi)}{\rho} \sqrt{r^2 - (\rho - R(\xi))^2} \\ -\frac{R(\xi)}{\rho} \sqrt{r^2 - (\rho - R(\xi))^2} \end{cases}$$

where r is the radius of the unit circle, and $\rho$ is the radial coordinate. Everything under the square root in this equation defines the circular port cross section's shape and position. Note that R is a function of the centerline path parametrization variable, $\xi$, as defined in the bump function defined above.

In pipe elbows with a tighter turn, the R term is smaller and the effect of the R/$\rho$ shaping modifier becomes more pronounced. As R becomes smaller (i.e. as the bend becomes tighter), the shape of the cross section becomes more triangular.

Lastly, the size of the cross-section may need to be modified at different points in the flow to ensure that cross-sectional area in the flow is preserved. CFD analysis has been done considering CFPE designs that sought to preserve either cross-sectional area along the length of the centerline or wetted perimeter along the length of the centerline and it was found that preserving cross-sectional area provided better performance across a range of Reynolds numbers.

It should be noted that the best savings offered by CFPE are for pipe elbows that have a tight "R/d". R/d refers to how tightly the elbow is bent relative to the pipe diameter. R/d=0.5 is the smallest defined R/d and is known as a miter bend. R/d can become arbitrarily large, but it becomes a straight pipe as it approaches infinity. Commonly, R/d ranges from 0.75 to 2. Tighter elbows, corresponding to smaller R/d are desired to turn the flow in tight real estate situations. Wider elbows are preferred to minimize irrecoverable pressure drop losses. Wider elbows have longer path length and thus incur linear increases in surface friction. The best R/d tends to be around 2 where flow separation causes the least trouble. However, note that installation constraints often dictate smaller R/d. Since CFPE targets flow separation and secondary flow for improvements, it tends to offer better results at lower R/d, which is an important range of R/d for the existing SPE market. Note that R is constant in SPEs which makes R/d unambiguous. However, in CFPE, the demand for a smooth bend means that R varies according to a bump function. Accordingly, a fair comparison of SPEs to CFPEs should provide equivalent location of the inlet and outlet ports.

The CFPE 20 may be considered to have a virtually infinite number of streamlines for fluid to pass through the same. FIG. 3 shows three of these streamlines for purposes of discussion. As shown in FIG. 3, these streamlines include: a first streamline S1 at the centroid of the inlet port; a second streamline S2 that is 80% of the distance between the centerline and the intrados; and a third streamline S3 that is 80% of the distance between the centerline and the extrados. In some cases, the height of the intermediate portion 26 of the pipe elbow 20 is varied at different radial positions across a cross-section of the pipe elbow so that when the pipe elbow is in use, the velocity of fluid through the pipe elbow along these three streamlines is within 20% of the velocity of fluid at the inlet port at all points along these three streamlines from the inlet port to the outlet port. In some cases, the CFPE may be 25%, 50%, or 75% more consistent in velocity (or any percentage greater than 25%) along those streamlines than an SPE with equivalent r/D (the term "equivalent r/D" refers to a pipe elbow that fits within the same box).

There are numerous, non-limiting embodiments of the invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

In other embodiments, the curvature of the pipe elbow could be different between the inlet and the intermediate portion than between the intermediate portion and the outlet. For example, a sharper curve near the inlet and a more gradual curve at the outlet might lead to less flow separation and secondary losses, which tend to occur after the apex near the outlet. However, such a design would make such an CFPE physically asymmetric and it would also be fluidically asymmetric meaning that it would require a direction marker on it indicating the direction of proper installation.

The CFPE may be built in the same manner as SPEs are built today. SPEs have ends that may be either slip fittings (e.g., welded or glued) or threaded (e.g., pipe thread). CFPEs can be produced to have all of these diverse fitting types. SPEs may be made of many materials such as metals or polymers, and the same is true for CFPEs. SPEs may be produced by casting, forming, additive manufacturing, and other manufacturing processes; the same is true for CFPEs. The CFPE shape is not complicated or onerous, being only a moderate departure from the shape of existing SPEs so net shape processes are feasible to build CFPE.

The improved pipe elbows described herein can be used in any field where fluids are moved through pipes. This is a vast array of fields including aerospace and defense, manufacturing, petrochemicals, biomedical, utilities, etc.

The improved pipe elbows described herein can provide a number of advantages. It should be understood, however, that these advantages need not be required unless they are set forth in the appended claims.

The improved pipe elbow is intended to reduce irrecoverable pressure drop through the pipe elbow. The improved pipe elbow enables pumps to push more flow through piping networks without requiring more work from the pumps. The improved pipe elbow can, therefore, reduce global energy usage and the accompanying effects of pollution. It also enables spacecraft fluidic systems such as thermal control systems and propellant systems to operate at lower pressures and with less energy, making them more efficient. In addition to the primary purpose of reducing energy consumption, several additional benefits are provided.

The improved pipe elbows: 1) condition the flow (i.e., provides straighter, smoother flow than in standard pipe elbows); 2) reduce erosion; 3) reduce or eliminate cavitation; 4) are free of vanes that pose snag risks; 5) are free of narrow points that pose clog risks; 6) do not consume additional space in comparison to a standard pipe elbow with a circular cross-section; 7) preserve the amount of cross-sectional area of an equivalent standard pipe elbow with a circular cross-section (which reduces irrecoverable pressure drop); 8) allocate flow space appropriately to disincentivize secondary flows; and 9) smoothly adjusts the curvature of the elbow to avoid sudden changes in direction of the flow.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 11A:
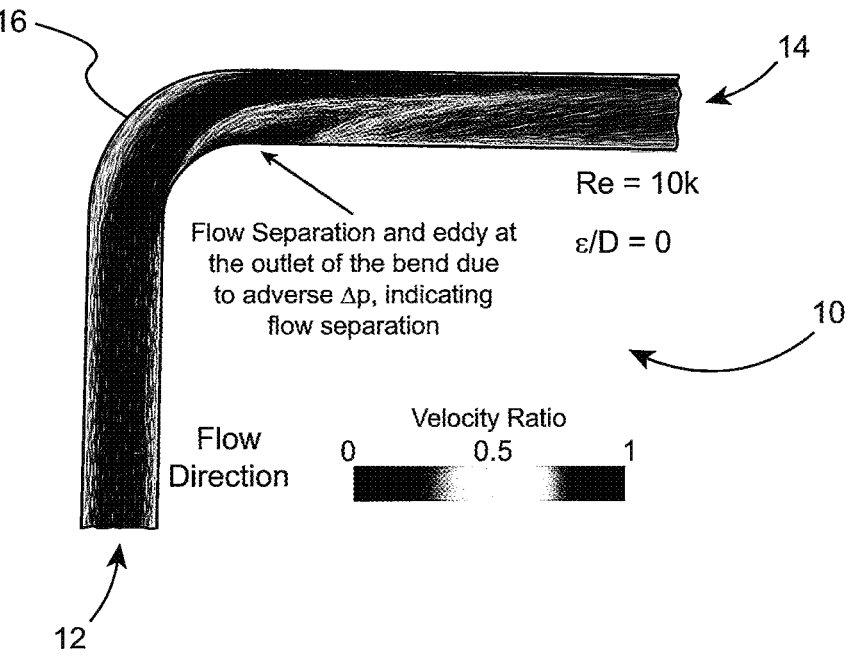
FIG. 11A is a computational fluid dynamics (CFD) diagram showing the fluid flow in a standard pipe elbow with a constant circular cross section.
Figure 11B:
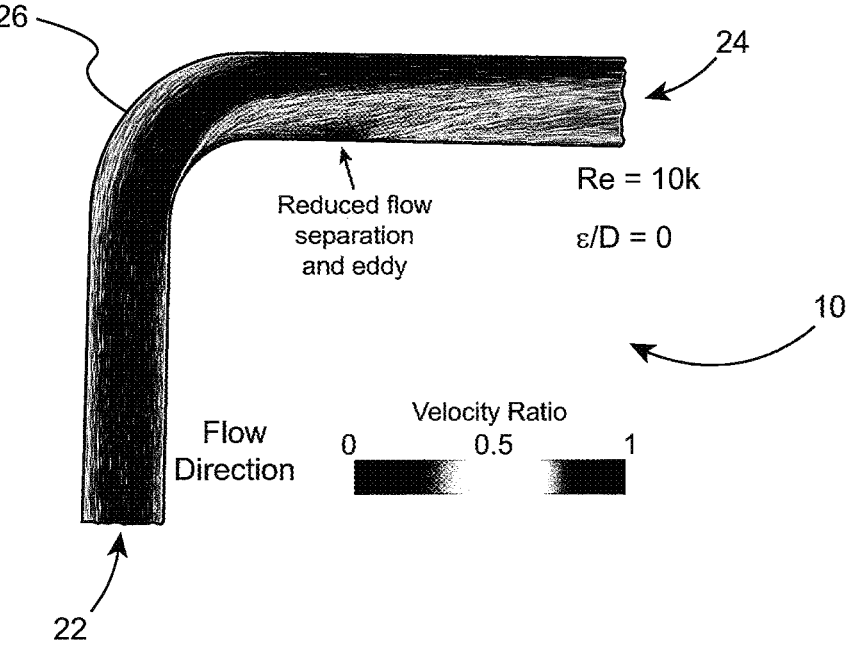
FIG. 11B is a computational fluid dynamics (CFD) diagram showing the fluid flow in one embodiment of the coordinated flow pipe elbow of the present invention.

FIGS. 11A and 11B show a comparison CFD model results of SPE and CFPE under representative conditions. The straight sections are shown there in order to demonstrate the effect of the pipe elbow on the downstream straight section.

FIG. 11A is a computational fluid dynamics (CFD) diagram showing the fluid flow in a standard pipe elbow 10 with a constant circular cross section. As shown in FIG. 8A, there is flow separation and eddy at the outlet of the bend 16.

FIG. 11B shows reduced flow separation and eddies at the outlet of the CFPE elbow and also less swirl downstream. CFD modeling of the CFPE in comparison against the SPE show a 20% reduction in irrecoverable pressure drop which equates to a 20% reduction in flow mechanical energy consumed by the CFPE in comparison to the SPE. This is because flow mechanical energy is the product of the irrecoverable pressure drop and the volumetric flow rate, which is true for any fluid mechanical system.

As used herein, an element or step recited in the singular and preceded with the word "a" or "an" should be understood as including the plural of such elements or steps, unless the plural of such elements or steps is specifically excluded.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A pipe elbow having an interior surface, an exterior surface, an interior, a centerline, and a bend having an axis of rotation and an apex, where the interior surface of the bend is defined by an inside curve and an outside curve, and intrados and extrados at a given cross-section of the bend, said pipe elbow comprising:

an inlet portion having an interior cross-section with a first cross-sectional configuration and a first cross-sectional area;

an outlet portion having an interior cross-section with a second cross-sectional configuration and second cross-sectional area; and an intermediate portion joined to said inlet and outlet portions between said inlet portion and said outlet portion, wherein said intermediate portion forms said bend, and said intermediate portion has an interior cross-section with a third cross-sectional configuration and a third cross-sectional area, wherein:

the interior cross-section of said intermediate portion is in the configuration of a closed figure which has a first region between the centerline and the intrados and a second region between the centerline and the extrados, wherein the first region has a larger cross-sectional area than said second region in which the interior of the intermediate portion is configured to provide a greater volume at the inside of the bend and less volume at the outside of the bend; and the first, second, and third cross-sectional areas are substantially the same while the third cross-sectional configuration is different from the first and second cross-sectional configurations.

2. The pipe elbow of claim 1 wherein the pipe elbow has a height in an axial direction, and the height of the intermediate portion is greater at the inside of the bend than it is at the outside of the bend across a cross-section of the pipe elbow.

3. The pipe elbow of claim 2 wherein the inlet portion defines an inlet port, the outlet portion defines an outlet port, and the height of the intermediate portion of the pipe elbow is varied at different radial positions across a cross-section of the pipe elbow so that when the pipe elbow is in use, the velocity of fluid through the pipe elbow along three streamlines is within 20% of the velocity of fluid at the inlet port at all points along these three streamlines from the inlet port to the outlet port, wherein the streamlines are at the following locations: 1) a first streamline at the centroid of the inlet port; 2) a second streamline that is 80% of the distance between the centerline and the intrados; and 3) a third streamline that is 80% of the distance between the centerline and the extrados.

4. The pipe elbow of claim 2 wherein the first cross-sectional configuration of the inlet is circular and the second cross-sectional configuration of the outlet is circular, and the interior cross-section of the intermediate portion is in the configuration of a round, non-circular curvilinear figure.

5. The pipe elbow of claim 4 wherein the round, non-circular curvilinear figure of the interior cross-section of the intermediate portion comprises three convexly-curved portions with a smaller radius of curvature, alternating with three convexly-curved portions with a larger radius of curvature, wherein the entire interior cross-section of the intermediate portion is comprised of convex curvilinear segments.

6. The pipe elbow of claim 5 wherein said interior cross-section of said intermediate portion is oriented so that one of said convexly-curved portions with a smaller radius of curvature is aligned adjacent to the outside portion of said bend, and two of said convexly-curved portions with a smaller radius of curvature are aligned adjacent to the inside portion of said bend.

7. The pipe elbow of claim 5 wherein the intermediate portion has an interior cross-section in a configuration defined by the equation:

$$a = \begin{cases} \dfrac{R(\xi)}{\rho}\sqrt{r^2 - (\rho - R(\xi))^2} \\[2ex] -\dfrac{R(\xi)}{\rho}\sqrt{r^2 - (\rho - R(\xi))^2} \end{cases}$$

where: $\rho$ is the radial coordinate, R is the radius of curvature, e is Euler's number, r is the radius of a circular inlet, and $\xi$ is a variable indicating progress along the centerline path parametrization variable, where $\xi=0$ at the apex of the bend, wherein the equation defines the interior cross-section of the pipe elbow in a way that reallocates the volume of the cross-section toward the intrados by adjusting the height out of the plane of the bend so that a larger height and area is provided at the intrados in proportion to the inverse of how far the cross-section of the elbow is away along the centerline from the center of the bend.

8. The pipe elbow of claim 1 wherein there is a mathematically smooth transition with no sudden changes that alter flow between the interior cross-section of the intermediate portion and the first cross-sectional configuration of the inlet and the second cross-sectional configuration of the outlet.

9. The pipe elbow of claim 8 wherein the centerline turns smoothly as defined by a bump function with compact support, wherein a bump function is a curve that is infinitely differentiable, and compact support means that the function is zero outside of a finite range.

10. The pipe elbow of claim 1 wherein the bend is defined by a plurality of axes of rotation, wherein each axis of rotation has a location relative to the bend, and the location of the axes of rotation for the intermediate portion changes for each cross-section taken along the centerline of the pipe elbow.

11. The pipe elbow of claim 1 wherein the pipe elbow has a length along its centerline from its inlet to its outlet, and the first, second, and third cross-sectional areas are the same along the entire length of the pipe elbow.

12. The pipe elbow of claim 1 wherein the bend has a variable radius of curvature.

13. The pipe elbow of claim 12 wherein the radius of curvature of the bend is largest adjacent the inlet and outlet portions and is smaller at the apex of the bend.

14. The pipe elbow of claim 13 wherein the variable radius of curvature starts out with an infinite radius of curvature and then gradually transitions to a smaller radius of curvature and then transitions back to an infinite radius of curvature, according to a bump function with compact support.

15. The pipe elbow of claim 1 the axis of rotation of the centerline continuously changes throughout the length of the centerline to facilitate the smooth turning of the flow of fluids in the interior of the pipe elbow and the shape of the interior cross-section of the pipe elbow is varied continuously and smoothly throughout the elbow to redirect tendencies toward swirling secondary flows into more minor motions out-of-plane of the elbow's bend plane.

16. The pipe elbow of claim 1 wherein the first cross-sectional configuration of the inlet is rectangular, the second cross-sectional configuration of the outlet is rectangular, and the interior cross-section of the intermediate portion is in the configuration of a closed figure having rectilinear segments that form the inside and outside portions of the cross-section, with the rectilinear inside portion of the intermediate portion has a greater height than that of the outside portion, and the cross-section of the intermediate portion comprises top and bottom portions which are tapered so that they increase in height from the outside portion to the inside portion of the cross-section.

17. A pipe elbow having an interior surface, an exterior surface, an interior, a centerline, and a bend having an axis of rotation and an apex, where the interior surface of the bend is defined by an inside curve and an outside curve, and intrados and extrados at a given cross-section of the bend, said pipe elbow comprising:

an inlet portion having an interior cross-section with a first cross-sectional configuration and a first cross-sectional area, wherein said first cross-section configuration is circular;

an outlet portion having an interior cross-section with a second cross-sectional configuration and second cross-sectional area, wherein said second cross-section configuration is circular; and an intermediate portion joined to said inlet and outlet portions between said inlet portion and said outlet portion, wherein said intermediate portion forms said bend, and said intermediate portion has an interior cross-section with a third cross-sectional configuration and a third cross-sectional area, wherein the third cross-sectional configuration of the intermediate portion is non-circular, wherein:

the interior cross-section of said intermediate portion is in the configuration of a closed non-circular curvilinear figure which has a first region between the centerline and the intrados and a second region between the centerline and the extrados, wherein the first region has a larger cross-sectional area than said second region, said closed non-circular curvilinear figure has a round configuration that is asymmetrical about the centerline so that the interior of the intermediate portion is configured to provide a greater volume of flow at the inside of the bend and less volume at the outside of the bend, said closed non-circular curvilinear figure has a height which is greatest between said intrados and said centerline, and said closed non-circular curvilinear figure comprising three convexly-curved portions with a smaller radius of curvature, alternating with three convexly-curved portions with a larger radius of curvature, wherein the entire interior cross-section of the intermediate portion is comprised of convex curvilinear segments, and said convexly-curved portions are arranged as follows:

wherein one of said convexly-curved portions with a smaller radius of curvature is located at the extrados;

two of said convexly-curved portions with a smaller radius of curvature are located between said intrados and said centerline; and one of said convexly-curved portions with a larger radius of curvature is located adjacent said intrados and extends from one of said two convexly-curved portions with a smaller radius of curvature that is located between said intrados and said centerline to the other convexly-curved portion with a smaller radius of curvature that is located between said intrados and said centerline, wherein the first, second, and third cross-sectional areas are the same, and the bend of said pipe elbow has a variable radius of curvature, and the configuration of said intermediate portion provides an increased volume for fluid to flow through the inside of the bend and less volume for fluid to flow at the outside of the bend.

18. A method of designing a pipe elbow having a centerline and a bend therein, wherein the pipe elbow has an inlet portion, an outlet portion, and an intermediate portion joined to said inlet and outlet portions between the inlet portion and the outlet portion, wherein the intermediate portion forms the bend, and the method comprises performing the following steps in any order:

1) Designing an inlet portion having an interior cross-section with a first cross-sectional configuration and a first cross-sectional area;

2) designing an outlet portion having an interior cross-section with a second cross-sectional configuration and second cross-sectional area; and 3) Designing an intermediate portion which has an interior cross-section with a third cross-sectional configuration and a third cross-sectional area, wherein the third cross-sectional configuration of the intermediate portion is different from the first and second cross-sectional configuration, wherein:

a) the intermediate portion has interior cross-sections in configurations that vary along the centerline and are defined by the equation:

$$a = \begin{cases} \dfrac{R(\xi)}{\rho}\sqrt{r^2 - (\rho - R(\xi))^2} \\ -\dfrac{R(\xi)}{\rho}\sqrt{r^2 - (\rho - R(\xi))^2} \end{cases}$$

where: $\rho$ is the radial coordinate, R is the radius of curvature, e is Euler's number, r is the radius of a circular inlet, and $\xi$ is a variable indicating progress along the centerline path parametrization variable, where $\xi$=0 at the apex of the bend;

b) the interior of the intermediate portion is oriented to provide a greater volume at the inside of the bend and less volume at the outside of the bend according to the equation in a) above which equation specifies how volume is reallocated by increasing the height out-of-plane of the bend plane in proportion to the inverse of how far that cross-section of the elbow is away from the center of the bend;

c) there is a smooth transition between the interior cross-section of the intermediate portion and the first cross-sectional configuration of the inlet and the second cross-sectional configuration of the outlet; and d) the centerline turns mathematically smoothly as defined by a bump function with compact support, wherein a bump function is a curve that is infinitely differentiable, and compact support means that the function is zero outside of a finite range.

19. The method of claim 18 wherein the first, second, and third cross-sectional areas are the same.

* * * * *